Jan. 5, 1960 E. J. CRONIN 2,919,639
APPARATUS FOR STERILIZING AND PRESERVING EGGS
Filed Oct. 20, 1955 3 Sheets-Sheet 1
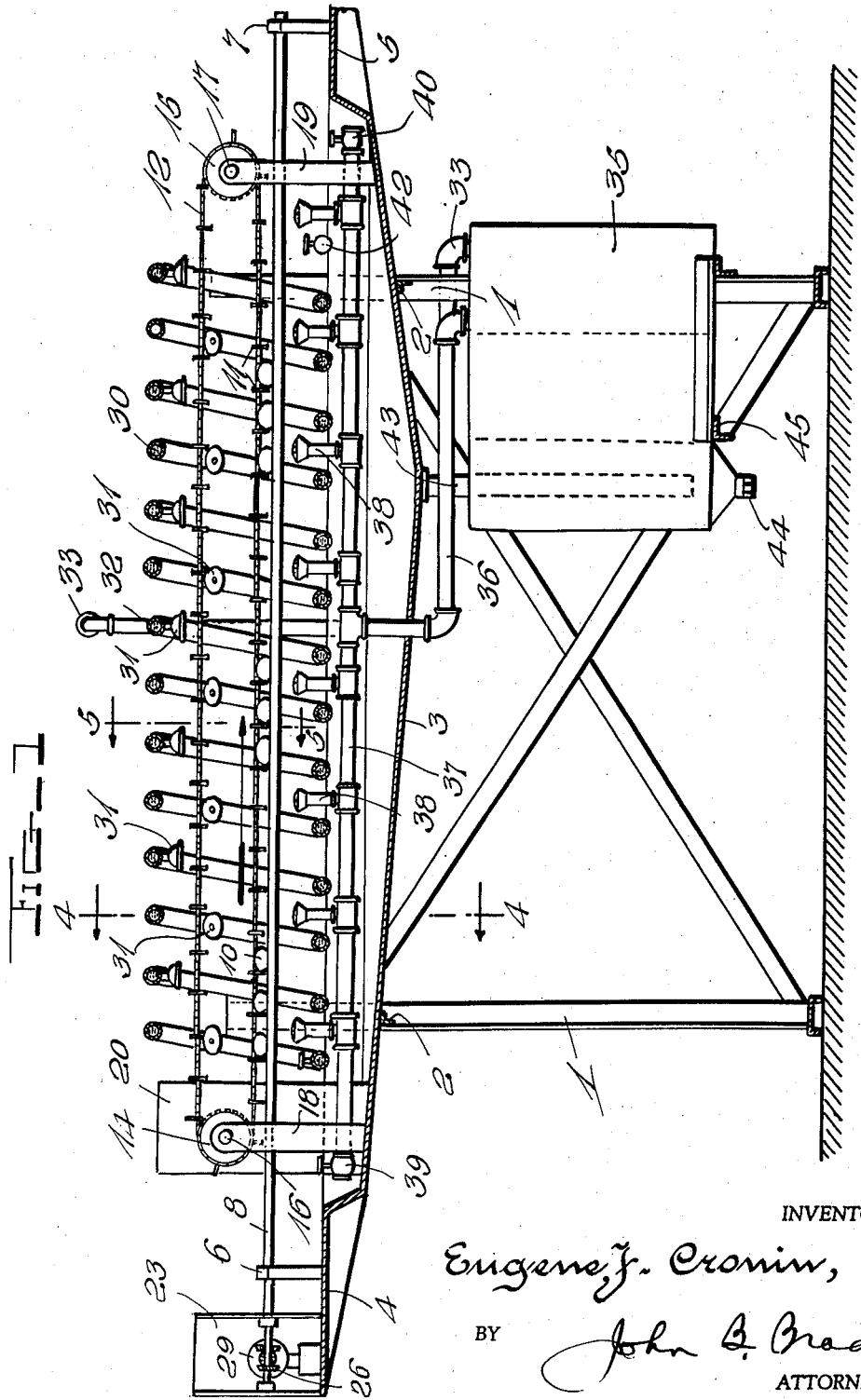
INVENTOR
Eugene J. Cronin,
BY John B. Brady
ATTORNEY

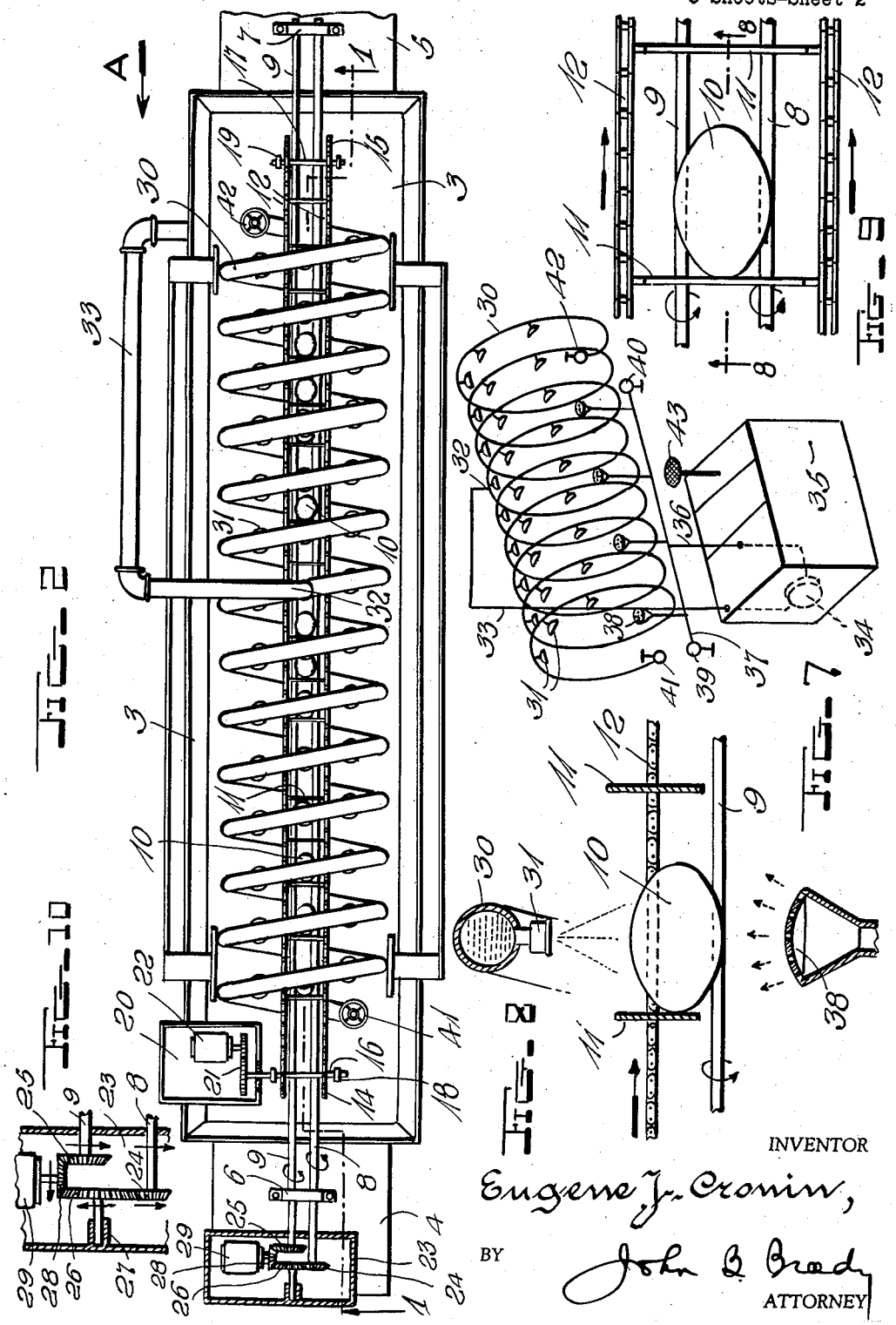

Jan. 5, 1960  E. J. CRONIN  2,919,639
APPARATUS FOR STERILIZING AND PRESERVING EGGS
Filed Oct. 20, 1955  3 Sheets-Sheet 3
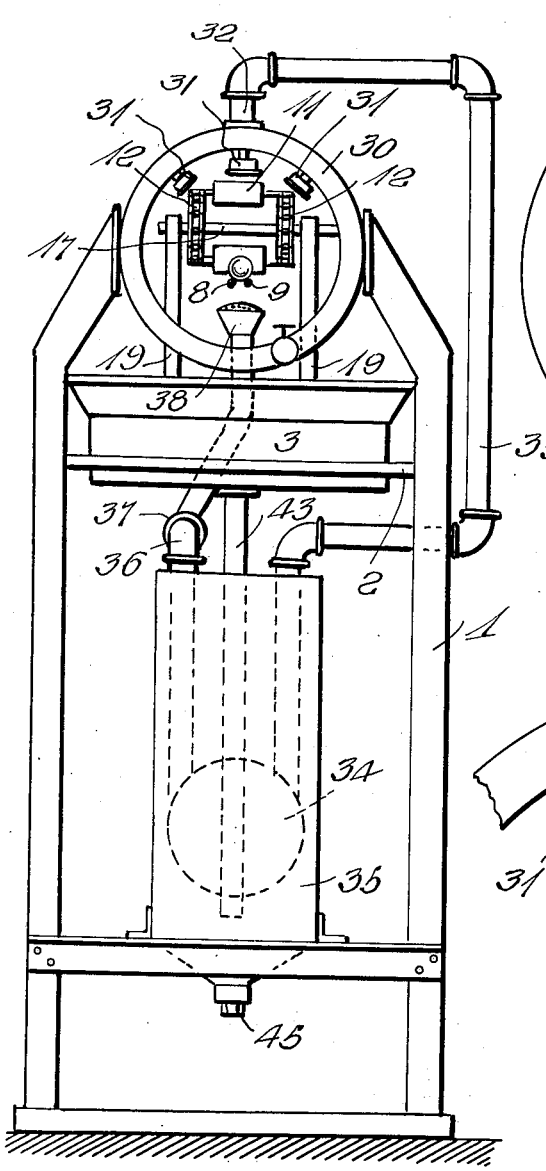
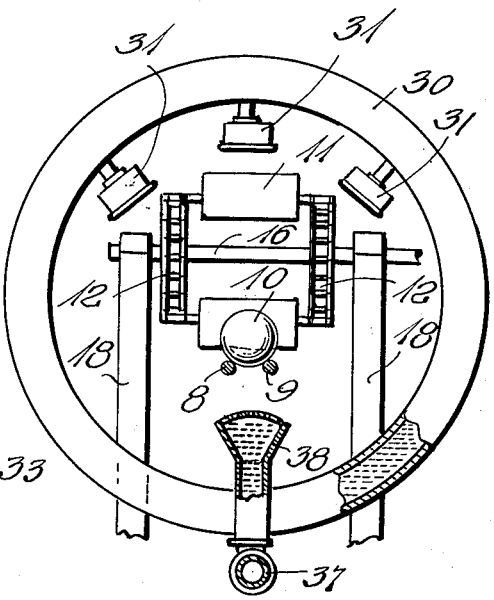
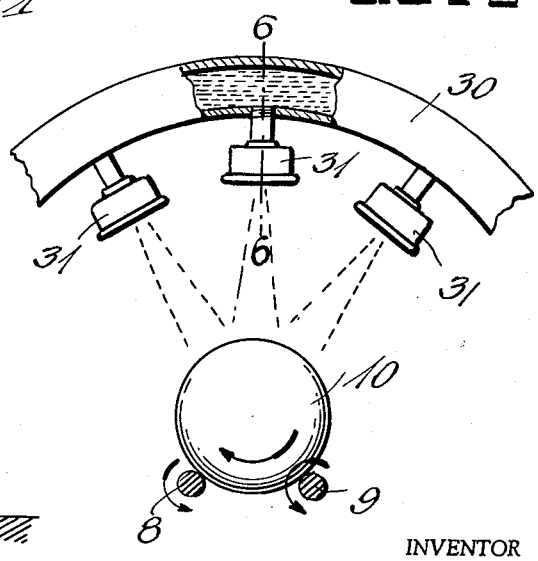
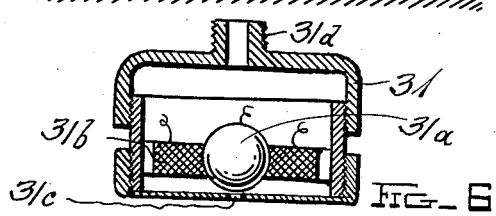
INVENTOR
Eugene J. Cronin,
BY
John B. Brady
ATTORNEY

United States Patent Office 2,919,639
Patented Jan. 5, 1960

2,919,639

APPARATUS FOR STERILIZING AND PRESERVING EGGS

Eugene J. Cronin, Menlo Park, Calif.

Application October 20, 1955, Serial No. 541,733

4 Claims. (Cl. 99—241)

My invention relates broadly to an ultrasonic system for the preservation of eggs and more particularly to an ultrasonic apparatus for preserving eggs.

One of the objects of my invention is to provide a structure of apparatus for sterilizing and preserving eggs on a mass production scale by which the surface of the shells of the eggs are sprayed with hot oil and also ultrasonically sprayed with a cooler oil while being processed through a conveyor system.

Another object of my invention is to provide an apparatus for preserving eggs in which the eggs are advanced along a conveyer system, and subjected to a composite heating and ultrasonic cooling treatment, and wherein the maximum heat treatment is effected at substantially the center of the conveyer system and the minimum heat treatment is applied to the eggs at the position of entrance and exit of the eggs with respect to the conveyer system.

Other and further objects of my invention reside in an apparatus for preserving eggs as set forth more fully in the specification hereinafter following by reference to the accompanying drawings, in which:

Fig. 1 is a longitudinal sectional view taken through the apparatus of my invention, the view being taken substantially on line 1—1 of Fig. 2 and showing certain of the components of the apparatus in front elevation;

Fig. 2 is a top plan view of the apparatus shown in Fig. 1;

Fig. 3 is an end view of the apparatus shown in Figs. 1 and 2 looking in the direction of arrow A in Fig. 2;

Fig. 4 is an enlarged fragmentary transverse sectional view taken substantially on line 4—4 of Fig. 2;

Fig. 5 is an enlarged fragmentary transverse sectional view explaining the theory of operation of the ultrasonic cooling means employed in the apparatus of my invention;

Fig. 6 is a central vertical sectional view taken through one of the ultrasonic nozzles used in the structure of my invention approximately on line 6—6 of Fig. 5;

Fig. 7 is a perspective view of the heating and cooling means employed in the apparatus of my invention;

Fig. 8 is a theoretical view on an enlarged scale showing the manner of heating and ultrasonically cooling the individual eggs;

Fig. 9 is an enlarged fragmentary plan view showing the manner of advancing and revolving the individual eggs; and Fig. 10 is a detail view illustrating on an enlarged scale the mechanism for revolving the eggs during the preserving process.

My invention is directed to apparatus for preserving eggs in the shell whereby they may remain at room temperature for a period exceeding three months and still grade out as a quality egg. The apparatus of my invention sterilizes the shell of the egg and leaves it in a sterilized condition for storage.

When the egg is originally laid the shell is covered with a mucilaginous coating which, upon drying, acts as a bacteria barrier for a matter of a few days. When an egg is laid there can be bacteria inside the shell but these do not necessarily cause deterioration of the egg since they are enjoying a symbiotic existence. However, by contamination certain proteolytic bacteria gain access to the inside of the egg by way of pores on the shell's surface. These protein destroying bacteria are the cause of egg deterioration. Bacterial contamination of the surface of the egg is brought about by dirty nesting conditions, dirty handling conditions, washing eggs with infected water, unsanitary processing equipment, the reuse of contaminated packaging equipment, and unsanitary storage conditions.

When the hen lays an egg it remains in the nest for a few hours at least. After that it is generally picked up by a farmhand, or an individual, who puts it into a container which has been used over and over again without ever being sterilized. The egg could be contaminated by coming in contact with such surfaces. The egg is then taken to a sorting house where it is candled for blood spots, cleaned by either sanding or washing, sized, and crated. All these operations involve the handling of the egg under unsterile conditions. If contaminated water is used in washing, the eggs so washed are of course exposed to additional contamination. The eggs are then packaged in reusable cases and then shipped to a processing house. Here the eggs are uncrated mechanically, placed on a conveying system, and conveyed to a candling station where they are again handled by the candler, checked for quality, size, and color, and placed either in another case or on a conveyor belt to be taken to a weighing station, and finally they are graded or boxed for consumer use.

Many times the egg is subjected to handling by many people, none of whom has observed any sterile techniques, but all of whom are able to further contaminate the egg.

A colony of bacteria in multiplying gradually spreads over the surface of the egg. Eventually members of the colony will arrive at the rim of a pore in the shell's surface. As the colony continues to multiply it will spread into the pores and eventually into the egg protein. The enzyme activity set up by a proteolytic bacteria will attack certain bonds of the protein molecule and cause it to change its structure thereby resulting in deterioration of the egg as we consider it for foodstuff.

The technique of applying oil to the surface of the egg has been a custom for many, many years. In fact, one of the earliest recorded references to this practice in American history is to be found in the writings of of Benjamin Franklin wherein he advised people traveling away from home in the summertime to carry their own supply of eggs in a container filled with oil. There have been many adaptations of this technique as described in the literature. Others have tried to attain the same end by using heat in its various forms, but to date none has described in the literature a process which will attack bacteria which is basically the cause of deterioration in eggs.

The apparatus described herein is one which provides means for attacking the bacteria on the surface of the egg, sterilizing the surface, and leaving it with a sterile oil film coating which acts as a barrier to further bacterial contamination. In this apparatus techniques similar to those of autoclaving, a fully accepted practice in bacteriological sterilization, are used. A suitable oil is heated well above the sterilization point and is then applied to the surface of the egg while still in its superheated condition. At the same time that the superheated oil is applied to one region of the egg, the rest of the egg is being treated with sterile oil which has been ultrasonically atomized for the purpose of obtaining the maximum fineness of particle size in the spray and also to apply this fine particulate spray to the surface of the egg so that maximum wetting conditions may be obtained on the shell's surface. The egg is simultaneously being revolved about its long axis while it is moving horizontally along the conveyer. In this way the egg is continually revolved so that the entire egg surface is exposed to the process in such a way that the atomized mist of sterile oil which has effected the wetting of the surface and allows direct and indirect contact with the bacteria on the surface of the shell. When a given region of the egg is next presented to the superheated oil, the heat transferred from the oil to the wetted surface of the shell is further transferred to the colonies of bacteria. Since the structure of a bacterial colony is mucilaginous, the moist heat from the hot oil will penetrate this mucilaginous mass without too much effort. The temperature of operation is maintained above that in which the bacteria can live. Once the bacteria have been killed by moist heat they can do no damage to the egg. At the same time, the ultrasonic atomized spray is needed for its cooling effects because of the heat lag in transfer of heat from the superheated oil. In other words, if the superheated oil was applied and provisions were not made for checking the penetration of the heat, the heat would penetrate to a depth beyond which it is wanted. In a given time a certain amount of the heat will have penetrated a certain distance in the shell. By removing the heat source from the shell, the process is checked.

To facilitate this procedure, the chamber in which the eggs are treated is designed so that the oil is fed into the center section of the heat exchange system and distributed to the two ends. In this way the hottest oil oil is delivered in the center of the unit and cooler oil is delivered to the entrance and exit zones. By this technique it is possible to preheat the egg at the entrance zone so that it is not heat shocked when the oil is applied at the maximum temperature. In addition it also allows the egg to cool as it is leaving the high heat zone prior to becoming exposed again to atmospheric temperature.

The oil that drips off of the egg during the process is collected by suitable means and returned to a heating vat where it is filtered, resterilized, and reused. While the egg is cooling down to room temperature, the excess oil on the surface is evaporated so that the egg carries only the optimum amount of oil to serve as a protective coating. In this way there is no waste involved and no contamination.

The apparatus of my invention is composed of mechanical, electrical, and electronic components. The mechanical parts are the transport mechanism used for carrying the eggs through the processing section. The electrical parts are motors, heat sources, and associated controls. The electronic parts are those used in generating ultrasonic energy which is used as the atomizing agent.

Two cylindrical rods are mounted horizontally in the same plane and in such relationship one to another that an egg can rest between the two rods. These rods are caused to turn in such a direction that the eggs are propelled through the processing machine point first. By reversing the direction of the rods the eggs can be made to proceed large end first. However, this is not as advantageous as the former method. The same technique is used in packaging eggs by causing the eggs moving through the unit to be deposited automatically at points downward into preformed packages.

In addition to these horizontally placed rods there is an additional mechanism which is composed of two endless chains revolving about four sprockets, two at each end of the treating chamber. These two endless chains are linked together at appropriate distances by rods which rotate with the chains and push each egg along its way.

The heat exchanger is designed to encompass the two parallel rods and the two continuous chains with the associated linkage. The heat exchanger is a helical tubular arrangement which is center fed and delivers to the ends simultaneously. By regulating the back pressure at each end by a valve or similar device, the temperature gradient across the entire structure can be controlled so that the forward end acts as a preheating chamber and the opposite end acts as a cooling chamber while the central portion acts as the high heat chamber. By discharging the liquid circulated in this heat exchanger through a fine hole (such as one drilled with a No. 80 drill) a very fine spray is developed. Since the increase in surface area from the fluid state of the hot oil to a fine mist is enormous, the temperature drop between the fluid and mist state of the oil is very steep in both time and caloric value. A drop of some 300 degrees can be experienced in a matter of seconds. This atomization effects the hot oil by converting it into a cooling medium. In order to obtain the maximum fineness of spray, ultrasonic techniques have been added to the process of atomization. This has been effected by inserting in each port of the helix a small unit constructed of a magnetostrictive sphere, energized by a suitable source of power, and positioned so that oil passing around said ultrasonic unit is forced through the minute porthole in direct line with the ultrasonic energy which is focused through the same port. The additional force added to the existing oil by ultrasonics is such that the cavitational effect produced by the ultrasonic energy can tear the smallest mist droplets (produced by the other technique) into actual molecules of oil.

The oil in this cavitated condition provides a most effective cooling mechanism. As the egg enters the processing chamber it is preheated above room temperature conditions so that it will not suffer heat shock when it arrives at the high heat chamber. As the egg leaves the high heat chamber it is cooled down by this spray for two reasons: (1) to eliminate heat lag penetration which would be detrimental to the egg, and (2) it reduces the shell's temperature to one more compatable with the room temperature into which it shall be transported for packaging.

The actual application of hot oil is accomplished by flushing oil on a small section of egg shell at a time. The superheated oil is flushed on the egg as it is rotated on the previously described parallel rods. As the treated portion of the egg raises out of the flushing range, the cavitated spray instantly removes the excess heat which would penetrate too deeply if allowed to remain.

Referring to the drawings in more detail, reference character 1 designates the frame structure of the apparatus of my invention, consisting of vertically extending angle members interconnected by transverse structural members indicated at 2 supporting a drain tray illustrated at 3 having end extensions 4 and 5. Standards 6 and 7 are erected on end extensions 4 and 5 and serve as journaling means for rotating support rods 8 and 9 which support and continuously rotate the eggs indicated at 10 during the treating operation.

A pair of sprocket chains 12 are located over the rods 8 and 9 and are supported by sprocket wheels 14 and 15 mounted on transverse shafts 16 and 17 journaled in standards 18 and 19, respectively. A gear and motor drive box is indicated at 20, housing the driving motor 22 and the gear train 21 for driving the shaft 16 and the sprocket wheels 14 thereon for correspondingly moving the sprocket chains 12. The sprocket chains 12 carry the pusher plates 11 which are suspended therefrom in the path of the eggs 10 for engaging the ends of the eggs 10 as shown more clearly in Figs. 8 and 9 and moving the eggs along the revolving rods 8 and 9.

The revolving rods 8 and 9 terminate in bevel gears 24 and 25, respectively, as shown more clearly in Figs. 2 and 10. These gears are driven by driving motor 29 through bevel gear 28 which meshes with bevel gears 25 on revolvable rod 29 and with the idler bevel gear 26 journaled at 27 and meshing with the bevel gear 24 on shaft 8. Thus driving motor 29 revolves the rotatable rods 8 and 9 simultaneously in the same direction for insuring the rotation of the eggs, as represented at 10, in Fig. 4, simultaneously with the advancement of the eggs along rods 8 and 9 under control of driving motor 22.

A spiral conduit for distributing oil is provided at 30 extending on a horizontal axis surrounding the revolvable rods 8 and 9 and the conveyor disposed over the rods. This spiral conduit is provided with a multiplicity of inwardly directed ultrasonic atomizing nozzles at 31 for directing pressure sprays toward the eggs 10, as indicated more clearly in Fig. 8. These ultrasonic nozzles are shown more clearly in Fig. 6 and are described in more detail in my copending application 515,101, filed June 13, 1955, now Patent No. 2,789,008, issued April 16, 1957, for "Ultrasonic Magnetostrictive Nozzle." Briefly, the nozzles includes the magnetostrictive sphere 31a and the magnetostrictive activating winding 31b which control the spraying of the fluid through the atomizing aperture 31c from the oil distributing conduit 30 through screw threaded connection 31d. The ultrasonic nozzles 31 insure the maximum fineness of particle size in the spray which is applied to the surface of the egg as indicated more clearly in Figs. 5 and 8. At the same time spray heads 38 located beneath the conveyor supply superheated oil to the eggs. The hot oil supplied to the ultrasonic nozzles is carried to the center of the spiral conduit 30 at the position 32.

Suitable pumping means are provided for the hot oil as represented at pump 34 located in the oil tank 35, the hot oil being forced through pipe line 33 to the center position 32 for distribution through the ultrasonic nozzles 31. There is provided an oil supply through pipe line 36 leading to the superheated spray heads 38 connected with distributor manifold 37. Needle valves 39, 40, 41 and 42 are provided for closing the several distribution pipes. A drain 43 is connected to the drain tray 3 for collecting the excess oil which falls into the drain tray 3. This oil is carried to a reservoir in oil tank 35 from which the oil is re-circulated by the pump 34. The heating means for the oil is contained within the oil tank 35. A suitable clean out plug 44 is provided at the bottom of the oil tank 35 for servicing the system. The oil tank 35 is suitably supported beneath the frame structure of the machine on bracket 45.

In operation of the machine of my invention the fresh eggs are delivered to the left hand end of the machine as viewed in Figs. 1 and 2 and advanced lineally toward the right hand end of the machine for delivery therefrom while being treated with the ultrasonically atomized sprays of hot oil. The eggs are continually revolved so that the entire egg surface is exposed to the process in such a way that the atomized mist of sterile oil released through ultrasonic nozzles 31 wets the entire surface of the egg. The ultrasonic atomized mist is delivered from a position located above a diametrical line through the spiral conduit 30. The combination of the ultrasonic atomized spray of hot oil and the superheated spray of oil produce a preservative effect upon the eggs providing a kind of preservative coating enabling the eggs to be stored over long periods of time while retaining their freshness.

I have found the apparatus of my invention highly practically and successful. While I have described certain preferred embodiments of my invention, I realize that modifications may be made and I desire that it be understood that no limitations upon my invention are intended other than may be imposed by the scope of the appended claims.

What I claim as new and desire to secure by Letters Patent of the United States is as follows:

1. Apparatus for sterilizing and preserving eggs comprising a frame structure, an oil distributing conduit supported on said frame structure, means for supplying hot oil under pressure to said oil distributing conduit, a plurality of ultrasonic atomizing nozzles connected with said conduit for distributing ultrasonically atomized hot oil, means for advancing eggs in the path of the ultrasonically atomized hot oil, means for revolving the eggs as the eggs are advanced through the atomizing hot oil, a second oil distributing conduit having sprayheads connected therewith and directed toward the eggs as they are advanced and revolved and means for supplying superheated oil under pressure through said sprayheads over said eggs additional to the ultrasonically atomized sprays of oil supplied to the eggs through said ultrasonic atomizing nozzles.

2. Apparatus for sterilizing and preserving eggs comprising a frame structure, an oil distributing conduit supported on said frame structure, means for supplying hot oil under pressure to said oil distributing conduit, a plurality of ultrasonic atomizing nozzles connected with said conduit for distributing ultrasonically atomized hot oil, means for advancing eggs in the path of the ultrasonically atomized hot oil, means for revolving the eggs as the eggs are advanced through the atomizing hot oil in which said oil distributing conduit is formed in a spiral and wherein said ultrasonic atomizing nozzles are connected with the inner portions of the turns thereof and directed toward the surfaces of the advancing eggs and in which there is an additional conduit extending in a lineal path longitudinally of and beneath said spiral conduit, a plurality of superheated oil spray nozzles connected with said additional conduit and extending between the turns of said spiral conduit and directed toward the path of movement of the eggs and means connected with said additional conduit for supplying superheated oil under pressure through said superheated oil spray nozzles.

3. Apparatus for sterilizing and preserving eggs comprising a frame structure, an oil distributing conduit supported on said frame structure, means for supplying hot oil under pressure to said oil distributing conduit, a plurality of ultrasonic atomizing nozzles connected with said conduit for distributing ultrasonically atomized hot oil, means for advancing eggs in the path of the ultrasonically atomized hot oil, means for revolving the eggs as the eggs are advanced through the atomizing hot oil, in which said oil distributing conduit is formed in a spiral and wherein said ultrasonic atomizing nozzles are connected with the inner portions of the turns thereof and directed toward the surfaces of the advancing eggs, and including an additional conduit extending in a lineal path longitudinally of and beneath said spiral conduit, a multiplicity of superheated oil spray nozzles disposed at spaced intervals along said additional conduit and directed toward the path of movement of the eggs, said ultrasonic atomizing nozzles being arranged within the quadrants above the transverse diameter of said spiral conduit and said superheated oil spray nozzles being disposed in the quadrants below the transverse diameter of said spiral conduit.

4. Apparatus for sterilizing and preserving eggs comprising a frame structure, an oil distributing conduit supported on said frame structure, means for supplying hot oil under pressure to said oil distributing conduit, a plurality of ultrasonic atomizing nozzles connected with said conduit for distributing ultrasonically atomized hot oil, means for advancing eggs in the path of the ultrasonically atomized hot oil, means for revolving the eggs as the eggs are advanced through the atomizing hot oil in which said oil distributing conduit is formed in a spiral and wherein said ultrasonic atomizing nozzles are connected with the inner portions of the turns thereof and directed toward the surfaces of the advancing eggs and including an additional conduit extending in a lineal path longitudinally of and beneath said spiral conduit, a plurality of superheated oil spray nozzles connected with said additional conduit and directed toward the path of movement of the eggs and means for supplying superheated oil under pressure through said superheated oil spray nozzles, said means for advancing said eggs and said means for revolving the eggs and the said ultrasonic atomizing nozzles and the said superheated oil spray nozzles all being located within the confines of said spiral conduit.

References Cited in the file of this patent

UNITED STATES PATENTS

| | | |
|---|---|---|
| 1,702,784 | Koplin | Feb. 19, 1929 |
| 2,512,743 | Hansell | June 27, 1950 |
| 2,603,039 | Slocum et al. | July 15, 1952 |
| 2,618,216 | Mulvany | Nov. 18, 1952 |
| 2,618,562 | Mulvany | Nov. 18, 1952 |
| 2,673,515 | Johnson | Mar. 30, 1954 |
| 2,733,150 | Mulvany | Jan. 31, 1956 |
| 2,777,784 | Miller | Jan. 15, 1957 |